(12) United States Patent
Lahar et al.

(10) Patent No.: US 9,989,111 B2
(45) Date of Patent: Jun. 5, 2018

(54) ADJUSTABLE BRAKE PAD SPREADER

(71) Applicants: Christopher L. Lahar, Fort Gratiot, MI (US); Christopher L. Lahar, II, Shelby Township, MI (US)

(72) Inventors: Christopher L. Lahar, Fort Gratiot, MI (US); Christopher L. Lahar, II, Shelby Township, MI (US)

( * ) Notice: Subject to any disclaimer, the term of this patent is extended or adjusted under 35 U.S.C. 154(b) by 0 days. days.

(21) Appl. No.: 15/212,812

(22) Filed: Jul. 18, 2016

(65) Prior Publication Data
US 2018/0017114 A1   Jan. 18, 2018

(51) Int. Cl.
*B23P 19/04*     (2006.01)
*F16D 65/00*     (2006.01)
*B25B 27/00*     (2006.01)

(52) U.S. Cl.
CPC ...... *F16D 65/0043* (2013.01); *B25B 27/0035* (2013.01)

(58) Field of Classification Search
USPC ............... 29/239, 267, 268; 269/3, 6, 171.5
See application file for complete search history.

(56) References Cited

U.S. PATENT DOCUMENTS

| | | | |
|---|---|---|---|
| 3,689,978 A * | 9/1972 | Kelso | B25B 27/023 29/259 |
| 6,874,217 B2 | 4/2005 | Ploeger et al. | |
| 7,076,850 B2 | 7/2006 | Ploeger et al. | |
| 7,770,277 B2 * | 8/2010 | Wridt | B25B 27/023 29/255 |
| 7,789,379 B2 * | 9/2010 | Livingston, Jr. | B25B 1/2405 269/249 |
| 8,381,372 B1 * | 2/2013 | Arnall | B25B 5/082 24/328 |

* cited by examiner

*Primary Examiner* — Joseph J Hail
*Assistant Examiner* — Shantese McDonald

(57) ABSTRACT

The adjustable brake pad spreader (20) compresses a brake pad against a brake caliper with the brake pad having a first flank and a second flank at opposite edges of the brake pad. The adjustable brake pad spreader (20) comprises a pair of frames (122, 222) and a pair of rods (138, 238) with each of the rods (138, 238) extending through the rear of each of the frames (122, 222) and along a pair of spreading axes (A, B) parallel and spaced an adjustment length (L) from one another. The adjustable brake pad spreader (20) further comprises an adjustment mechanism (84) supporting each of the frames (122, 222) for adjusting the adjustment length (L) between each of the spreading axes (A, B) to engage a brake pad at various distances between the first flank and second flank of the brake pad.

5 Claims, 3 Drawing Sheets

ADJUSTABLE BRAKE PAD SPREADER

BACKGROUND OF THE INVENTION

1. Field of the Invention

The present invention relates to an adjustable brake pad spreader that compresses a brake pad against a brake caliper with the brake pad having a first flank and a second flank at opposite edges of the brake pad.

2. Description of the Prior Art

A brake pad spreader is designed to compress a brake pad against a brake caliper. Such a brake pad spreader is disclosed in U.S. Pat. No. 6,874,217, issued on Apr. 5, 2005, in the name of Plogeger et al. This brake pad spreader includes a frame having a front and a rear opposing each other. A rod extends through the rear of the frame and along a spreading axis. The rod engaged the brake pad in the middle of the brake pad, which requires considerable force to compress the brake pad.

SUMMARY OF THE INVENTION

The invention provides such an adjustable brake pad spreader characterized by an adjustment mechanism supporting a pair of frames for adjusting the adjustment length between a pair of spreading axes to engage the brake pad at various distances between the first flank and second flank of the brake pad.

Advantages of the Invention

The adjustable brake pad spreader in its broadest aspect allows a user to easily compress any size brake bad because the force needed to compress the brake pad is much less by compressing the brake pad at the first flank then the second flank than the force needed to compress the brake pad at the middle.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Referring to the Figures, wherein like numerals indicate corresponding parts throughout the several views, an adjustable brake pad spreader 20 for compressing a brake pad against a brake caliper with the brake pad having a first flank and a second flank at opposite edges of the brake pad.

Figure 1:
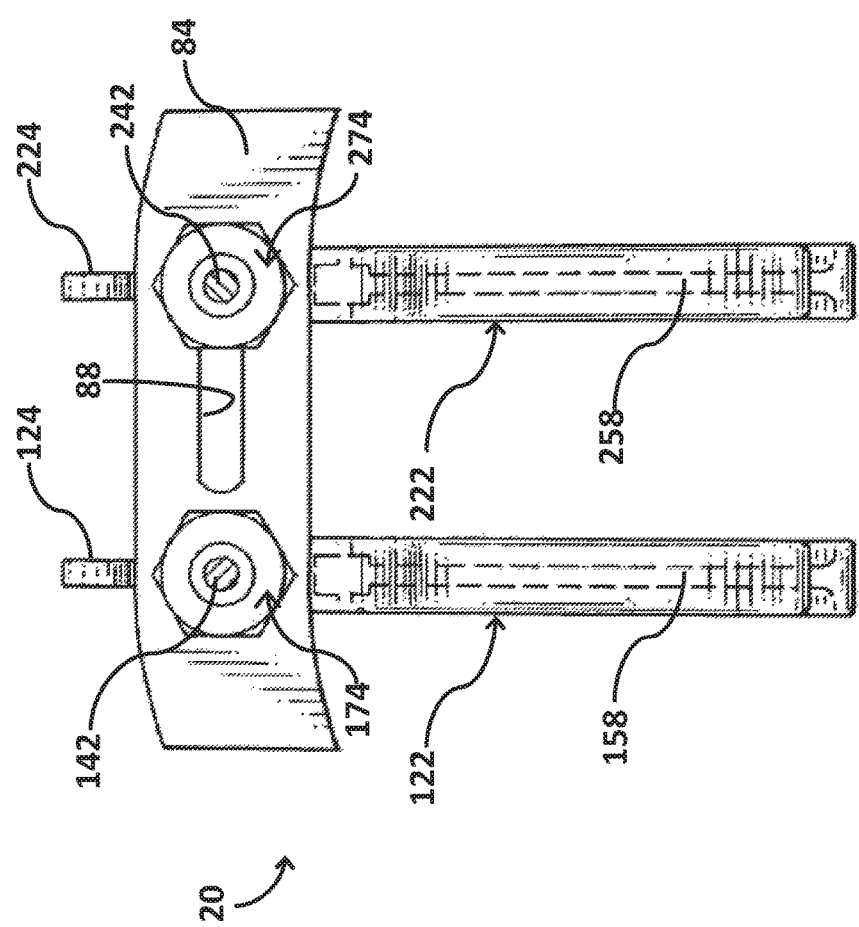
FIG. 1 is a front view of the enabling embodiment.
Figure 2:
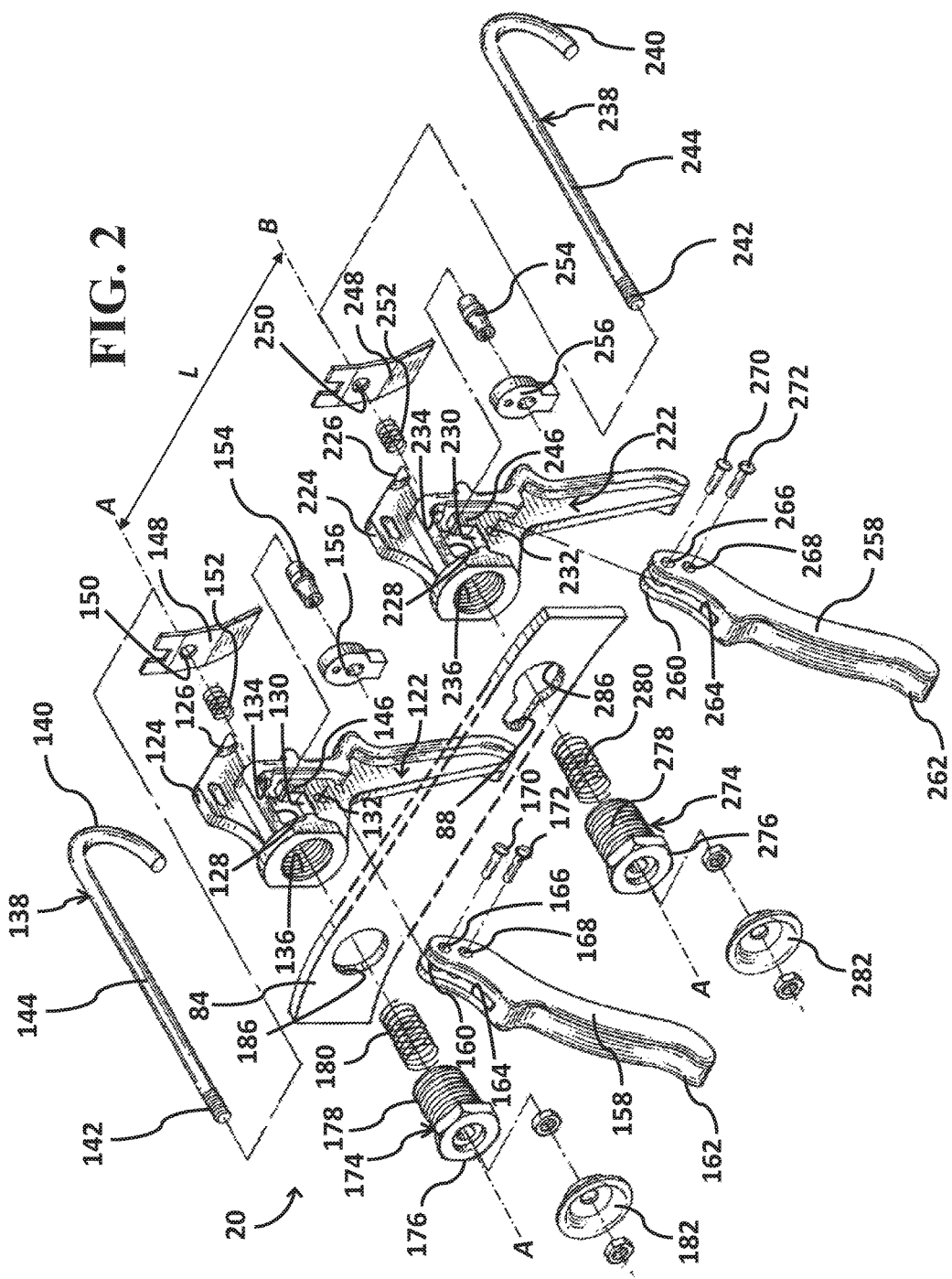
FIG. 2 is a perspective exploded view of the enabling embodiment.
Figure 3:
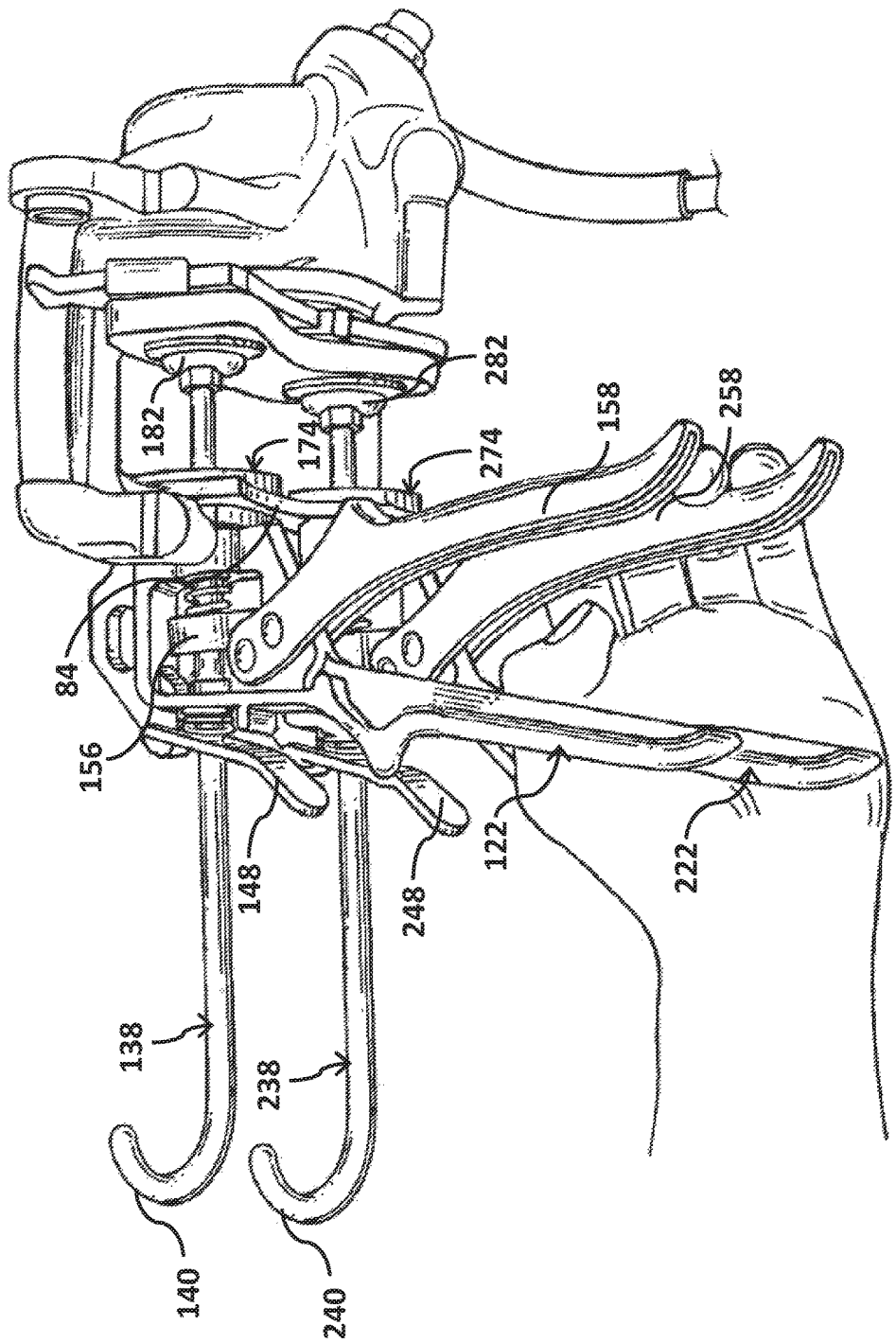
FIG. 3 is a perspective view illustrating the enabling embodiment with the brake pad compressed in the brake caliper.

The adjustable brake pad spreader 20, as generally shown in FIGS. 1 through 3, consists of a pair of frames 122, 222 with each frame 122, 222 having a front and a rear, which oppose each other. Each frame 122, 222 has a top and a pair of sides extending between the front of the frame 122, 222 and the rear of the frame 122, 222. A rib 124, 224 extends along and upwardly away from the top of each frame 122, 222. The rib 124, 224 further extends from the front of each frame 122, 222 to the rear of each frame 122, 222 to present a butt end 126, 226 that extends outwardly from the rear of each frame 122, 222.

As best shown in FIG. 2, each frame 122, 222 presents a bore 128, 228 that extends through the sides of each frame 122, 222 at the top of each frame 122, 222. Each frame 122, 222 further presents a guideway 130, 230 that extends into the sides of each frame 122, 222 and away from the top of each frame 122, 222, as well as adjacent to the bore 128, 228 of each frame 122, 222 between the front of each frame 122, 222 and the rear of each frame 122, 222. Each frame 122, 222 further presents an insert 132, 232 extending through the sides of each frame 122, 222 that is spaced from the guideway 130, 230 of each frame 122, 222.

The rear of each frame 122, 222 presents a first channel 134, 234 that extends through the rear of each frame 122, 222 at the top of each frame 122, 222, and into the bore 128, 228 of each frame 122, 222 below the butt end 126, 226 of the rib 124, 224. The front of each frame 122, 222 presents a second channel 136, 236 that extends through the front of each frame 122, 222 at the top of each frame 122, 222, and into the bore 128, 228 of each frame 122, 222. The first channel 134, 234 of the rear of each frame 122, 222 defines a first wall that extends circumferentially about a pair of spreading axes A, B which are parallel and spaced an adjustment length L from one another. The second channel 136, 236 of the front of each frame 122, 222 defines a second wall that is threaded and extends circumferentially about the spreading axes A, B. Furthermore, the second wall of the second channel 136, 236 of the front of each frame 122, 222 extends a greater radius circumferentially about the spreading axes A, B than the first wall of the first channel 134, 234 of the rear of each frame 122, 222 extends circumferentially about the spreading axes A, B.

A pair of rods 138, 238, with each rod 138, 238 having a curved end 140, 240 and a distal end 142, 242 with a straight section 144, 244 therebetween, extends along the spreading axes A, B through the first channel 134, 234 of the rear of each frame 122, 222 and the second channel 136, 236 of the front of each frame 122, 222. The curved end 140, 240 of each rod 138, 238 extends outwardly from the straight section 144, 244 of each rod 138, 238 away from the first channel 134, 234 of the rear of each frame 122, 222. The distal end 142, 242 of each rod 138, 238 is threaded and extends outwardly from the straight section 144, 244 of each rod 138, 238 away from the second channel 136, 236 of the front of each frame 122, 222. Each frame 122, 222 further presents a stop 146, 246 disposed in the bore 128, 228 of each frame 122, 222 that extends between the guideway 130, 230 of each frame 122, 222 and the rear of each frame 122, 222 spaced from the straight section 144, 244 of each rod 138, 238.

A locking bar 148, 248 is mounted to the butt end 126, 226 of the rib 124, 224 and extends downwardly from the butt end 126, 226 of the rib 124, 224 toward the first channel 134, 234 of the rear of each frame 122, 222 and is spaced from the rear of each frame 122, 222. The locking bar 148, 248 defines a cutout 150, 250 that extends circumferentially about the straight section 144, 244 of each rod 138, 238 at the curved end 140, 240 of each rod 138, 238. A rear spring 152, 252 is disposed helically about the straight section 144, 244 of each rod 138, 238 at the curved end 140, 240 of each rod 138, 238 between the first channel 134, 234 of the rear of each frame 122, 222 and the cutout 150, 250 of the locking bar 148, 248.

A fitting 154, 254 is disposed in the first channel 134, 234 of the rear of each frame 122, 222 and circumferentially about the straight section 144, 244 of each rod 138, 238. A tab 156, 256 are disposed in the bore 128, 228 of each frame 122, 222, circumferentially about the straight section 144, 244 of each rod 138, 238, and extends from the straight section 144, 244 of each rod 138, 238 toward the guideway 130, 230 of each frame 122, 222 for slidingly engagement with the guideway 130, 230 of each frame 122, 222.

A pair of handles 158, 258 with each handle 158, 258 having an upper end 160, 260 and a lower end 162, 262 with the upper end 160, 260 of each handle 158, 258 defining a notch 164, 264 that extends into the upper end 160, 260 of each handle 158, 258 towards the lower end 162, 262 of each handle 158, 258. The upper end 160, 260 of each handle 158, 258 defines a first hole 166, 266 that extends through each handle 158, 258 and perpendicular to the notch 164, 264 of each handle 158, 258. The upper end 160, 260 of each handle 158, 258 further defines a second hole 168, 268 that extends through each handle 158, 258 below the first hole 166, 266 of each handle 158, 258 and perpendicular to the notch 164, 264 of each handle 158, 258. The first hole 166, 266 of each handle 158, 258 is aligned with the guideway 130, 230 of each frame 122, 222. The second hole 168, 268 of each handle 158, 258 is aligned with the insert 132, 232 of each frame 122, 222. A first peg 170, 270 extends though the first hole 166, 266 of each handle 158, 258 and slidingly engages the guideway 130, 230 of each frame 122, 222 between the tab 156, 256 and the stop 146, 246 of each frame 122, 222. A second peg 172, 272 extends through the second hole 168, 268 of each handle 158, 258 and the insert 132, 232 of each frame 122, 222.

A pair of bolts 174, 274 with each bolt 174, 274 threadedly engaging the distal end 142, 242 of each rod 138, 238 and is spaced from the front of each frame 122, 222. Each bolt 174, 274 includes a flange portion 176, 276 with a screw portion 178, 278 that extends from the flange portion 176, 276 of each bolt 174, 274 and threadingly engages the second wall of the second channel 136, 236 of the front of each frame 122, 222. A front spring 180, 280 is disposed in the bore 128, 228 of each frame 122, 222 and extends helically about the straight section 144, 244 of each rod 138, 238 between the tab 156, 256 and the screw portion 178, 278 of each bolt 174, 274. A pair of plungers 182, 282 with each plunger 182, 282 having a concave surface and a convex surface that threadingly engage the distal end 142, 242 of each rod 138, 238 and are spaced from the flange portion 176, 276 of each bolt 174, 274 for engaging the brake pad. A pair of nuts threadingly engage the distal end 142, 242 of each rod 138, 238 to secure each plunger 182, 282 on the distal end 142, 242 of each rod 138, 238 with at least one of the nuts engaging the concave surface of each plunger 182, 282 and the other nut engaging the convex surface of each plunger 182, 282.

As best shown in FIG. 3, the adjustable brake pad spreader 20 is characterized by an adjustment mechanism 84 that supports each of the frames 122, 222 for adjusting the adjustment length L between the spreading axes A, B to engage the brake pad at various distances between the first flank and second flank of the brake pad. The adjustment mechanism 84 is disposed between the front of each of the frames 122, 222 and the flange portions 176, 276 of the bolts 174, 274 to define a pair of slots 186, 286 with each slot 186, 286 extending circumferentially about the spreading axes A, B with the straight section 144, 244 of each rod 138, 238 extending through each slot 186, 286 of the adjustment mechanism 84. As best shown in FIG. 1, the adjustment mechanism 84 further defines a slit 88 that extends from at least one of the slots 186 of the adjustment mechanism 84 and is spaced from the opposite slot 286 of the adjustment mechanism 84 to allow the straight section 144, 244 of each rod 138, 238 to slide along the slit 88 of the adjustment mechanism 84 to position each plunger 182, 282 at the first flank and the second flank of the brake pad.

In operation, a user adjusts each of the rods 138, 238 along the adjustment mechanism 84 to position each plunger 182, 282 at each flank of the brake pad. When the plungers 182, 282 are properly positioned at each flank of the brake pad, the user may tighten each bolt 174, 274 to lock each frame 122, 222 in position. Once in position, the user then actuates one of the handles 158 to push the rod 138 forward and have the plunger 182 compress that flank of the brake pad. Once one flank of the brake pad has been compressed, the user actuates the other handle 258 to push the other rod 238 forward and have the other plunger 282 compress the opposite flank of the brake pad. As a result, the user can easily compress any size brake bad because the force needed to compress the brake pad is much less at the flanks of the brake pad than right in the middle. It should be appreciated that the same operation could be accomplished having only one frame 122 including an alternating gear to actuate both plungers 182, 282 with only one handle 158 by actuating the handle 158 twice to compress the first flank of the brake pad and then the second flank of the brake pad, one at time.

Obviously, many modifications and variations of the present invention are possible in light of the above teachings and may be practiced otherwise than as specifically described while within the scope of the appended claims. That which is prior art in the claims precedes the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. An adjustable brake pad spreader (20) for compressing a brake pad against a brake caliper with the brake pad having a first flank and a second flank at opposite edges of the brake pad, comprising;

a pair of frames (122, 222) with each of said frames (122, 222) having a front and a rear opposing each other with a top and a pair of sides extending between said front of said frame (122, 222) and said rear of said frame (122, 222), a rib (124, 224) extending along and upwardly away from said top of each of said frames (122, 222) and extending from said front of each of said frames (122, 222) to said rear of each of said frames (122, 222) to present a butt end (126, 226) extending outwardly from said rear of each of said frames (122, 222), each of said frames (122, 222) presenting a bore (128, 228) extending through each of said sides of each of said frames (122, 222) at said top of each of said frames (122, 222), each of said frames (122, 222) further presenting a guideway (130, 230) extending into said sides of each of said frames (122, 222) and away from said top of each of said frames (122, 222) and adjacent to said bore (128, 228) of each of said frames (122, 222) between said front of each of said frames (122, 222) and said rear of each of said frames (122, 222), each of said frames (122, 222) further presenting an insert (132, 232) extending through each of said sides of each of said frames (122, 222) spaced from said guideway (130, 230) of each of said frames (122, 222), said rear of each of said frames (122, 222) further presenting a first channel (134, 234) extending through said rear of each of said frames (122, 222) at said top of each of said frames (122, 222) and into said bore (128, 228) of each of said frames (122, 222) below said butt end (126, 226) of said rib (124, 224), said front of each of said frames (122, 222) further presenting a second channel (136, 236) extending through said front of each of said frames (122, 222) at said top of each of said frames (122, 222) and into said bore (128, 228) of each of said frames (122, 222), said first channel (134, 234) of said rear of each of said frames (122, 222) defining a first wall extending circumferentially about a pair of spreading axes (A, B) parallel and spaced an adjustment length (L) from one another, said second channel (136, 236) of said front of each of said frames (122, 222) defining a second wall being threaded and extending circumferentially about each of said spreading axes (A, B), said second wall of said second channel (136, 236) of said front of each of said frames (122, 222) extending a greater radius circumferentially about each of said spreading axes (A, B) than said first wall of said first channel (134, 234) of said rear of each of said frames (122, 222) extends circumferentially about each of said spreading axes (A, B), a pair of rods (138, 238) including a curved end (140, 240) and a distal end (142, 242) with a straight section (144, 244) therebetween with each of said rods (138, 238) extending along each of said spreading axes (A, B) through said first channel (134, 234) of said rear of each of said frames (122, 222) and said second channel (136, 236) of said front of each of said frames (122, 222), said curved end (140, 240) of each of said rods (138, 238) extending outwardly from said straight section (144, 244) of each of said rods (138, 238) away from said first channel (134, 234) of said rear of each of said frames (122, 222), said distal end (142, 242) of each of said rods (138, 238) being threaded and extending outwardly from said straight section (144, 244) of each of said rods (138, 238) away from said second channel (136, 236) of said front of each of said frames (122, 222), each of said frames (122, 222) further presenting a stop (146, 246) disposed in said bore (128, 228) of each of said frames (122, 222) extending between said guideway (130, 230) of each of said frames (122, 222) and said rear of each of said frames (122, 222) spaced from said straight section (144, 244) of each of said rods (138, 238), a locking bar (148, 248) mounted to said butt end (126, 226) of said rib (124, 224) and extending downwardly from said butt end (126, 226) of said rib (124, 224) toward said first channel (134, 234) of said rear of each of said frames (122, 222) and spaced from said rear of each of said frames (122, 222), said locking bar (148, 248) defining a cutout (150, 250) extending circumferentially about said straight section (144, 244) of each of said rods (138, 238) at said curved end (140, 240) of each of said rods (138, 238), a rear spring (152, 252) disposed helically about said straight section (144, 244) of each of said rods (138, 238) at said curved end (140, 240) of each of said rods (138, 238) between said first channel (134, 234) of said rear of each of said frames (122, 222) and said cutout (150, 250) of said locking bar (148, 248), a fitting (154, 254) disposed in said first channel (134, 234) of said rear of each of said frames (122, 222) and circumferentially about said straight section (144, 244) of each of said rods (138, 238), a tab (156, 256) disposed in said bore (128, 228) of each of said frames (122, 222) and circumferentially about said straight section (144, 244) of each of said rods (138, 238) and extending from said straight section (144, 244) of each of said rods (138, 238) toward said guideway (130, 230) of each of said frames (122, 222) for slidingly engagement with, said guideway (130, 230) of each of said frames (122, 222), a pair of handles (158, 258) having an upper end (160, 260) and a lower end (162, 262) with said upper end (160, 260) of each of said handles (158, 258) defining a notch (164, 264) extending into said upper end (160, 260) of each of said handles (158, 258) towards said lower end (162, 262) of each of said handles (158, 258), said upper end (160, 260) of each of said handles (158, 258) defining a first hole (166, 266) extending through each of said handles (158, 258) and perpendicular to said notch (164, 264) of each of said handles (158, 258), said upper end (160, 260) of each of said handles (158, 258) further defining a second hole (168, 268) extending through each of said handles (158, 258) below said first hole (166, 266) of each of said handles (158, 258) and perpendicular to said notch (164, 264) of each of said handles (158, 258), said first hole (166, 266) of each of said handles (158, 258) aligned with said guideway (130, 230) of each of said frames (122, 222), said second hole (168, 268) of each of said handles (158, 258) aligned with said insert (132, 232) of each of said frames (122, 222), a first peg (170, 270) extending though said first hole (166, 266) of each of said handles (158, 258) and slidingly engaging said guideway (130, 230) of each of said frames (122, 222) between said tab (156, 256) and said stop (146, 246) of each of said frames (122, 222), a second peg (172, 272) extending through said second hole (168, 268) of each of said handles (158, 258) and said insert (132, 232) of each of said frames (122, 222), a pair of bolts (174, 274) with each of said bolts (174, 274) threadedly engaging said distal end (142, 242) of each of said rods (138, 238) and spaced from said front of each of said frames (122, 222), each of said bolts (174, 274) including a flange portion (176, 276) with a screw portion (178, 278) extending from said flange portion (176, 276) of each of said bolts (174, 274) and threadingly engaging said second wall of said second channel (136, 236) of said front of each of said frames (122, 222), a front spring (180, 280) disposed in said bore (128, 228) of each of said frames (122, 222) and extending helically about said straight section (144, 244) of each of said rods (138, 238) between said tab (156, 256) and said screw portion (178, 278) of each of said bolts (174, 274), a pair of plungers (182, 282) with each of said plungers (182, 282) having a concave surface and a convex surface threadingly engaging said distal end (142, 242) of each of said rods (138, 238) and spaced from said flange portion (176, 276) of each of said bolts (174, 274) for engaging the brake pad, a pair of nuts threadingly engaging said distal end (142, 242) of each of said rods (138, 238) to secure each of said plungers (182, 282) on said distal end (142, 242) of each of said rods (138, 238) with at least one of said nuts engaging said concave surface of each of said plungers (182, 282) and at least one of said nuts engaging said convex surface of each of said plungers (182, 282), and characterized by, an adjustment mechanism (84) supporting each of said frames (122, 222) for adjusting the adjustment length (L) between each of said spreading axes (A, B) to engage the brake pad at various distances between the first flank and second flank of the brake pad, said adjustment mechanism (84) disposed between said front of each of said frames (122, 222) and said flange portions (176, 276) of each of said bolts (174, 274), said adjustment mechanism (84) defining a pair of slots (186, 286) with each of said slots (186, 286) extending circumferentially about each of said spreading axes (A, B) with said straight section (144, 244) of each of said rods (138, 238) extending through each of said slots (186, 286), said adjustment mechanism (84) further defining a slit (88) extending from at least one of said slots (186) of said adjustment mechanism (84) and spaced from said opposite slot (286) of said adjustment mechanism (84) to allow at least one of said straight sections (144, 244) of each of said rods (138, 238) to slide along said slit (88) of said adjustment mechanism (84) to position each of said plungers (182, 282) at the first flank and second flank of the brake pad.

2. An adjustable brake pad spreader (20) for compressing a brake pad against a brake caliper with the brake pad having a first flank and a second flank at opposite edges of the brake pad, comprising;

a pair of frames (122, 222) with each of said frames (122, 222) having a front and a rear opposing each other, a pair of rods (138, 238) with each of said rods (138, 238) extending through said rear of each of said frames (122, 222) and along a pair of spreading axes (A, B) parallel and spaced an adjustment length (L) from one another, said frames (122, 222) with a top and a pair of sides extending between said front of said frame (122, 222) and said rear of said frame (122, 222), a rib (124, 224) extending along and upwardly away from said top of each of said frames (122, 222) and extending from said front of each of said frames (122, 222) to said rear of each of said frames (122, 222) to present a butt end (126, 226) extending outwardly from said rear of each of said frames (122, 222), an adjustment mechanism (84) supporting each of said frames (122, 222) for adjusting the adjustment length (L) between each of said spreading axes (A, B) to engage the brake pad at various distances between the first flank and second flank of the brake pad.

3. An adjustable brake pad spreader (20) as set forth in claim 2 wherein said adjustment mechanism (84) defines a pair of slots (186, 286) with each of said slots (186, 286) extending circumferentially about each of said spreading axes (A, B) with each of said rods (138, 238) extending through each of said slots (186, 286).

4. An adjustable brake pad spreader (20) as set forth in claim 3 wherein said adjustment mechanism (84) further defines a slit (88) extending from at least one of said slots (186) of said adjustment mechanism (84) and spaced from said opposite slot (286) of said adjustment mechanism (84) to allow at least one of said rods (138, 238) to slide along said slit (88) of said adjustment mechanism (84) to position each of said rods (138, 238) at the first flank and second flank of the brake pad.

5. An adjustable brake pad spreader (20) as set forth in claim 4 further including a pair of bolts (174, 274) with each of said bolts (174, 274) threadedly engaging each of said rods (138, 238) and spaced from said front of each of said frames (122, 222) wherein said adjustment mechanism (84) is disposed between said front of each of said frames (122, 222) and each of said bolts (174, 274).

* * * * *